BEST AVAILABLE COPY
BEST AVAILABLE COPY
H. CLARKE.
UMBRELLA-LOCK.
No. 6,957. Reissued Feb. 29, 1876.
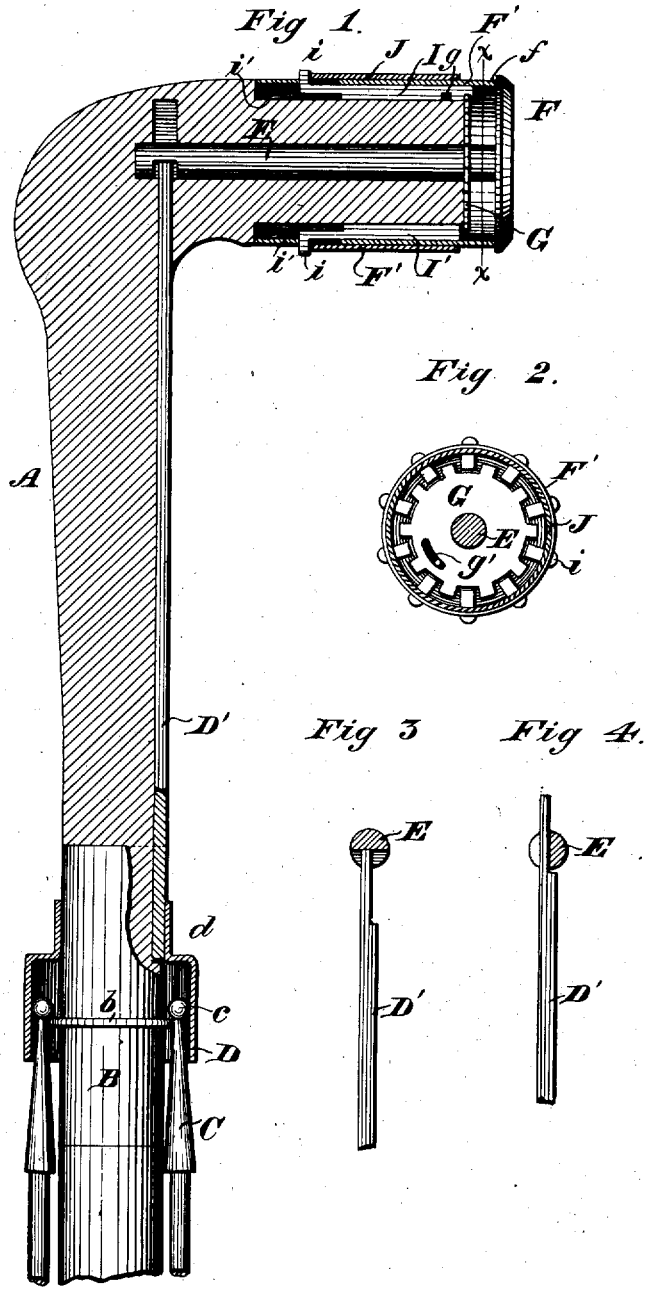
WITNESSES
Wm A Skinkle
Wm J. Peyton
INVENTOR
Henry Clarke.
By his Attorney.
Wm D. Baldwin

BEST AVAILABLE COPY

UNITED STATES PATENT OFFICE.

HENRY CLARKE, OF BALTIMORE, MARYLAND, ASSIGNOR, BY MESNE ASSIGNMENTS, TO THE CLARKE LOCK COMPANY.

IMPROVEMENT IN UMBRELLA-LOCKS.

Specification forming part of Letters Patent No. 109,386, dated November 22, 1870; reissue No. 6,957, dated February 29, 1876; application filed February 14, 1876.

*To all whom it may concern:*

Be it known that I, HENRY CLARKE, of Baltimore city, in the State of Maryland, have invented certain new and useful Improvements in Combination-Locks, of which the following is a specification:

My invention relates to a novel keyless combination-lock, in which the tumblers are arranged around and movable endwise in line, substantially parallel, with a central spindle; and its object is to provide a simple, inexpensive, unpickable, and efficient lock. This end I attain by combining with a series of transversely-notched tumblers, arranged around a central axis, and movable endwise in suitable guides, a locking-plate turning on said axis, so that it may be released and locked by the tumblers, as desired, when their notches are properly brought into line. I also combine with said tumblers an enveloping sleeve or band, having a movement both of rotation and of translation on its axis, whereby the tumblers may be retracted all together, thus setting the passive tumblers in proper relation with the locking-plate, while the active ones are moved separately and independently of the others to set the combination.

The subject-matter claimed hereinafter specifically will be designated.

In the accompanying drawings, my invention is shown as mounted upon the handle of an umbrella, and as co-operating with mechanism for locking the slide, which holds the ribs of an umbrella close to the stick, in order to prevent the use of the umbrella by one unacquainted with the combination.

Figure 1 represents a vertical longitudinal central section through the lock; Fig. 2, a transverse section therethrough on the line *x x* of Fig. 1. Figs. 3 and 4 represent transverse sections through the lock-spindle, showing its mode of interlocking with the slide-bar, which carries the locking-sleeve of the umbrella-handle.

The handle A of the umbrella is represented as having a bent hand-piece, upon the end of which the lock is mounted. A metallic band, B, provided with an annular flange, *b*, is secured upon the umbrella-handle in such relation to the balls or bulbs *c*, formed upon the ends of the ribs C of the umbrella, that said bulbs shall just overlap the annular flange when the ribs are closed upon the handle. A sleeve, D, of a size sufficient to inclose the bulbs *c* of the ribs C, is secured to a neck, *d*, sliding freely endwise on the band B.

Owing to this construction, when the ribs are pressed close to the umbrella-handle, and the sleeve slid over them, the umbrella is locked in its closed position, and cannot be opened without withdrawing the sleeve.

A bar, D′, sliding freely endwise in a groove in the handle, or in the interior of the hollow handle, is secured at one end to the sleeve D, while its other end takes into a groove on the end of the spindle E, capable of turning freely in the handle. The form of the groove or notch in the spindle, which interlocks with the sliding bar D, is clearly shown in Figs. 1, 3, and 4, from an inspection of which it will be evident that when the sleeve D is shoved down over the tips, and the spindle turned to the position shown in Figs. 1 and 3, that the umbrella will be securely locked, and that when the spindle is turned, as in Fig. 4, the sliding bar may be shoved up to release the umbrella-tips. The shaft or spindle E passes in through the bend or hand-piece of the handle A, and carries at a point intermediate between its ends a disk or notched plate, G. A series of grooves are cut longitudinally in the handle, parallel with each other, corresponding in number with the notches of the plate G. In each of these grooves slide one of a series of tumblers, I I′, provided with knobs, studs, or projections *i*, projecting beyond the periphery of the handle. A disk, F, mounted upon the outer end of the spindle E, is provided with a ring or cup, F′, of a size sufficient to fit over the notched plate G and the tumblers I I′, thus holding the latter securely in position while allowing them to slide freely. Springs *i′* at the back of the tumblers serve to keep them pressed outward against the ring F′, and compensate any wear of said tumblers. A band, J, is fitted to turn freely upon and

BEST AVAILABLE COPY move endwise on the ring F′, its motion in one direction being limited by the projecting flange *f* of the ring, and in the other by studs *i* of the tumblers, which project beyond its periphery, and whose range is limited by the length of the groove in which they move.

The tumblers are of two classes, active or true tumblers I, and passive or false ones I′. Each tumbler slides through its respective notch in the plate G, and is shoved away from said plate by sliding the band J away from the disk F. In this position, as shown in Fig. 1, the false tumblers will be clear of the notched plate; but the active or true tumblers are made longer than the false ones, so that when retracted, as above described, they will still interlock with the notched plate G, and prevent the shaft E from being turned. These tumblers are released by moving the band J toward the disk F, and then moving the active tumblers in the same direction, one at a time, until their notches *g* coincide with the edge of the plate G, when the latter, as well as the spindle E, can be turned in either direction desired to lock or unlock the lock. This turning movement is limited by a slot and pin, *g*, as shown in Fig. 2.

The relative order and number of the true and false tumblers may be varied indefinitely, so as to produce an indefinite number of combinations. In case the lock be attached to a straight handle, the spindle E would, of course, lie parallel with the stick of the umbrella.

The operation of the device will be readily understood from the foregoing description.

I claim as of my own invention—

1. The combination, in a keyless lock, substantially as hereinbefore set forth, of the locking-plate, the tumblers, arranged concentrically around and moving endwise through said plate, and the ring surrounding the tumblers and plate, beyond which ring the tumblers protrude, so as to be independently adjustable from the outside.

2. The combination, substantially as hereinbefore set forth, in a keyless lock, of a central shaft or spindle, a locking-plate mounted thereon, independent endwise-moving tumblers arranged concentrically around the spindle, and an enveloping-ring, beyond which the tumblers protrude, for the purposes specified.

3. The combination, substantially as hereinbefore set forth, of a locking-plate, tumblers moving endwise through said plate, a ring surrounding said tumblers and plate, and a band movable endwise on the ring.

4. The combination, substantially as hereinbefore set forth, of endwise-moving tumblers, provided with laterally-projecting studs, and an enveloping-band, movable endwise upon the tumblers, whereby they may be all simultaneously moved in one direction by the band and afterward be independently adjusted by hand.

5. The combination, substantially as hereinbefore set forth, of endwise-moving active and passive tumblers, a locking-plate and enveloping-sleeve, and a shaft or spindle interlocking with an intersecting slide-bar.

6. The combination, substantially as hereinbefore set forth, of the turning locking-spindle of a combination-lock, a sliding sleeve, and a sliding bar, mounted on said sleeve and intersecting the locking-notch of the turning-spindle.

7. A keyless combination-lock consisting of the combination of a central shaft or spindle, a locking-plate mounted thereon, endwise-moving tumblers, an enveloping-ring, and an endwise-movable band surrounding said ring and tumblers.

HENRY CLARKE.

Witnesses:
E. C. DAVIDSON,
WM. J. PEYTON.